Patented Mar. 1, 1938

2,109,877

UNITED STATES PATENT OFFICE

2,109,877

ESTER INTERCHANGE PROCESS

Harold James Barrett, Niagara Falls, N. Y., assignor to E. I. du Pont de Nemours & Company, Wilmington, Del., a corporation of Delaware No Drawing. Application November 20, 1935, Serial No. 50,711

16 Claims. (Cl. 260—2)

This invention relates to a process for the synthesis of interpolymers of different esters of acrylic acid or of its homologs carrying a substituent in the alpha position, and to the products so obtained.

It is known to polymerize mixtures of different monomeric esters of acrylic acid or of its homologs. This method is of limited utility, however, largely because of the different rates of polymerization of different esters. Moreover, the method is believed to result, at least in part, in mixtures of polymers rather than true interpolymers. The primary objective of this invention is the preparation of true interpolymers from simple polymeric esters, i. e. esters in which the radical of only one alcohol is combined. Another object is the provision of a method for synthesizing interpolymers which obviates the difficulties inherent in processes such as those involving polymerization of mixtures of different monomeric esters.

These objects, as well as others which will be apparent as the description proceeds, are accomplished by reacting a simple polymeric ester of acrylic acid, or of an alpha substituted acrylic acid, with an alcohol different from the alcohol whose radical is present in the original polymeric ester, under conditions favorable to the interchange of alcohol radicals. This interchange of alcohol radicals is effected by heating the alcohol and polymeric ester together, preferably in the presence of alkaline alcoholysis catalysts. The interchange proceeds most readily if the alcohol selected for reaction with the polymeric ester boils at a higher temperature than the alcohol liberated by the interchange, because the latter alcohol is then more readily removed from the zone of reaction, for example by distillation.

It is well known to replace the alcohol radical of a monomeric ester by another alcohol radical through heating the ester and alcohol with an alcoholysis catalyst. However, the fact that this reaction took place with a polymeric ester was a very surprising result, for the following reasons. Polymers are substances whose molecules contain a recurring structural unit, the nature of which may be inferred either from the products of degradation of the polymer or from the materials from which the polymer is synthesized. Two types of polymers may be distinguished. In the first of these, of which rubber, polystyrene, polyacrylic and polymethacrylic acids and their esters, polyoxymethylene, etc. are typical, the molecular formulas of the structural unit and of the parent molecule are identical. In the second type, which includes the polyethylene glycols, cellulose, and silk fibroin, the molecular formulas of the structural unit and of the parent molecule differ by one molecule of water. Polymers of the first type are generally considered as being highly chemically unreactive, i. e., they show great resistance to saponification, esterification, etc. The present invention rests upon the discovery that, in contrast to the general behavior of the class, the polymers of acrylic or of alpha-substituted acrylic acid esters enter readily into reaction with alcohols, an interchange of alcohol radicals being the result. Alkaline alcoholysis catalysts are particularly favorable for the promotion of this reaction. The selection of these alcoholysis catalysts likewise was not apparent from a consideration of the art on ester interchange with monomeric esters.

In the practice of the present invention a solution of the polymeric acrylic or alpha substituted acrylic acid ester is heated with an alcohol other than that forming the ester, preferably, but not necessarily, in the presence of a suitable ester interchange catalyst, until the desired quantity of liberated alcohol has been removed. The interpolymer formed may then be isolated and purified.

The following examples illustrate but do not limit the present invention:

*Example 1—Methyl methacrylate-isobutyl methacrylate interpolymer*

To a solution of 100 grams of methyl methacrylate polymer in 400 grams of dry toluene was added 74 grams of isobutyl alcohol, and the mixture refluxed under a 48-inch fractionating column fitted with a distilling head arranged for controlled reflux, until all the moisture present in the reagents had been removed. Portions of a solution of 4.9 grams of sodium in 50 grams of methanol were then added at intervals during the course of 17 hours of heating, and a toluene-methanol (B. P.=64° C.) binary was removed periodically at the head of the column. The refluxing and the collecting of the binary were continued until no more methanol was liberated. The reaction mixture was cooled, diluted with 2000 c. c. of toluol, filtered, the solution washed twice with 1000 c. c. portions of water, and the washed solution concentrated to about half its volume by vacuum distillation. The concentrate was centrifuged, and then filtered. The product obtained, after removal of the solvent, was a yellow, brittle resin and on the basis of carbon and hydrogen analyses, corresponded to an interpolymer of 74% isobutyl methacrylate and 26% methyl methacrylate. The interpolymer obtained is compatible with linseed oil whereas pure methyl methacrylate polymer is incompatible with drying oils.

*Example 2—Methyl methacrylate-n-propyl methacrylate interpolymer*

To a solution of 200 grams of methyl methacrylate polymer in 800 grams of toluene was added 120 grams of n-propyl alcohol and the mixture refluxed under a 48-inch fractionating column fitted with a still-head arranged for controlled reflux, until all the moisture present in the reagents had been removed. Then a solution of 9.8 grams of sodium in 100 grams of methanol was added in 20 c. c. portions at intervals over a period of 26 hours, during which time a toluene-methanol binary (B. P. 64° C.) was collected at the head of the column. The refluxing and collecting of binary were continued until no more methanol was liberated, the reaction mixture cooled, a slurry of 7 grams of sodium carbonate in 25 grams of water added, and the mixture vigorously stirred and blown with carbon dioxide for one hour. Fifty grams of "Filtercel" were added, the mixture centrifuged twice, and then filtered. The product obtained after removal of the solvent was a yellow, brittle resin intermediate in its properties between pure methyl methacrylate polymer and pure normal-propyl methacrylate polymer. Analysis of the product showed it to contain approximately 68% normal-propyl methacrylate and 32% methyl methacrylate. In contrast to pure methyl methacrylate polymer, the product obtained was compatible with linseed oil, and in contrast to normal-propyl methacrylate polymer, it was incompatible with drying oil modified alkyd resins.

*Example 3—Methyl methacrylate-cyclohexyl methacrylate interpolymer*

To a solution of 200 grams of methyl methacrylate polymer in 800 grams of toluene were added 612 grams of toluene and 200 grams of cyclohexanol and the mixture refluxed under a 48-inch fractionating column fitted with a still-head arranged for controlled reflux, until all the moisture present in the reagents had been removed. A solution of 9.8 grams of sodium in 100 grams of methanol was then added in 20 c. c. portions during a period of about 55 hours, during which time a toluene-methanol binary (B. P.=64° C.) was collected at the head of the column. The refluxing and collecting of binary were continued until no more methanol was liberated. The reaction mixture was cooled, 25 grams of water added, and the mixture vigorously stirred and continuously saturated with carbon dioxide for one hour. Fifty grams of "Filtercel" were then added, the mixture centrifuged twice, and filtered. The product obtained after removal of solvent and unreacted cyclohexanol was a yellow, brittle resin. Analysis of the product showed it to be an interpolymer whose composition corresponded to about 24% cyclohexyl methacrylate and 76% methyl methacrylate. This product, in contrast to pure methyl methacrylate polymer, was compatible with drying oils, and, in contrast to pure cyclohexyl methacrylate polymer, was incompatible with drying oil modified alkyd resins.

*Example 4—Methyl methacrylate-beta-diethylaminoethyl methacrylate interpolymer*

To a solution of 100 grams of methyl methacrylate polymer in 400 grams of benzene was added 117 grams of beta-diethylaminoethanol and 200 c. c. of dry benzene, and the mixture refluxed under a 48" fractionating column fitted with a still-head arranged for controlled reflux until all the moisture present in the reagents had been removed. A solution of 6 grams of sodium in 50 c. c. of methanol was then added dropwise over a period of 21 hours, during which time a benzene-methanol binary (B. P. 58° C.) was collected at the head of the column. The refluxing and collecting of the binary were continued until no more methanol was liberated. The solution remaining in the flask was cooled, and then poured slowly with stirring into a large volume of gasoline. The precipitate was separated, washed several times with gasoline, allowed to dry, then extracted several times with hot water, and finally washed several times with cold water. The product obtained after drying was a slightly cream-colored granular solid, soluble in acetone, acetone-water mixtures, ethanol, ethanol-water mixtures, methanol, methanol-water mixtures, esters, dioxan, ether, benzyl alcohol, benzene-ethanol mixtures, toluene-ethanol mixtures, pyridine, and in concentrated and dilute acids. Analysis of the product showed it to contain 3.42% nitrogen which corresponds to an interpolymer of 2 mols of methyl methacrylate to 1 mol. of beta-diethylaminoethyl methacrylate. In contrast to pure methyl methacrylate, this resin is soluble in acids.

The above experiment was repeated using 60 grams of beta-diethylaminoethanol instead of 117 grams. The product obtained contained 2.58% nitrogen which corresponds to an interpolymer of 3.5 mols of methyl methacrylate to 1 mol. of beta-diethylaminoethyl methacrylate. In appearance and solubility, the product was similar to that obtained above.

*Example 5—Methyl methacrylate-beta-dimethylaminoethyl methacrylate interpolymer*

To a solution of 275 grams of methyl methacrylate polymer in 1100 grams of dry benzene was added 244 grams of beta-dimethylaminoethanol and 1000 grams of dry benzene, and the mixture refluxed under a 48-inch fractionating column fitted with a still-head arranged for controlled reflux until all the moisture present in the reagents had been removed. Eight grams of sodium in 80 c. c. of methanol was then added over a period of 44 hours, during which time a benzene-methanol binary (B. P. 58° C.) was collected at the head of the column. The product obtained was precipitated and purified as in Example 4. Analysis of the product showed it to contain 1.96% nitrogen which corresponds to an interpolymer of 5.5 mols of methyl methacrylate to 1 mol. of beta-dimethylaminoethyl methacrylate. The product was soluble in acetone, alcohol, esters, dioxan, pyridine, chloroform, toluene-alcohol mixtures, benzene-alcohol mixtures, toluene, and benzene. In contrast to pure methyl methacrylate polymer the product was soluble in concentrated and dilute acids.

*Example 6—Methyl methacrylate-beta-dicyclohexylaminoethyl methacrylate interpolymer*

To a solution of 100 grams of methyl methacrylate polymer in 400 grams of dry benzene was added 75 grams of beta-dicyclohexylaminoethanol and 400 c. c. of dry benzene. The ester interchange was carried out as described in Example 4 over a period of 25.5 hours, using 6 grams of sodium in 60 c. c. of methanol as catalyst. The interpolymer was precipitated and purified as before, and was a light, cream-colored granular solid. Analysis of the product showed it to contain 1.54% nitrogen which corresponds to an interpolymer of 6.5 mols of methyl methacrylate to 1 mol. of beta-dicyclohexylaminoethyl methacrylate. The product was soluble in benzyl alcohol, acetone, ethyl acetate-ethyl alcohol mixtures, chloroform, pyridine, benzene, toluene, benzene-alcohol mixtures, and toluene-alcohol mixtures.

*Example 7—Methyl acrylate-beta-dimethylaminoethyl acrylate interpolymer*

To a solution of 86 grams of methyl acrylate polymer in 344 grams of benzene was added 86 grams of beta-dimethylaminoethanol and 300 c. c. of dry benzene and the mixture ester interchanged as in Example 4 over a period of 15 hours, using 6 grams of sodium in 60 c. c. of methanol as the catalyst. The solution remaining in the flask was then poured slowly with stirring into a large volume of gasoline to precipitate the interpolymer, the precipitate separated, and dissolved in toluene. The toluene solution was centrifuged, and the product recovered by evaporation of the toluene under reduced pressure. The product obtained was a tough, amber-colored resin containing 5.36% nitrogen which corresponds to an interpolymer of 2 mols of dimethylaminoethyl acrylate to 3 mols of methyl acrylate. The product was soluble in a 90% toluene-10% ethyl alcohol mixture, an 80% benzene-20% ethyl alcohol mixture, acetone, ethanol, methanol, dioxan, ether, benzyl alcohol, benzene, toluene, ethyl acetate-ethyl alcohol mixtures, pyridine, and in dilute and concentrated acids. Polymeric methyl acrylate is not soluble in acids.

*Example 8—Methyl methacrylate-methoxyethyl methacrylate interpolymer*

To a solution of 200 grams of methyl methacrylate polymer in 800 grams of dry toluene was added 154 grams of beta-methoxyethanol, and the mixture refluxed under a 48" fractionating column fitted with a distilling head arranged for controlled reflux until all of the moisture present in the reagents had been removed. Portions of a solution of 9.8 grams of sodium in 100 grams of methanol were added at intervals during the course of 63 hours of heating, and a toluene-methanol binary (B. P. 64° C.) being removed at the head of the column. The refluxing and the collecting of the binary were continued until no more methanol was liberated. The reaction mixture was cooled, 25 grams of water added, and the mixture vigorously stirred while continuously saturating with carbon dioxide for 1½ hours. Twenty-seven grams of "Filtercel" was added, the mixture centrifuged twice, and then filtered. The product obtained after removal of the solvent was a yellow, brittle resin, intermediate in its properties between pure methyl methacrylate polymer and pure methoxyethyl methacrylate polymer. Analysis of the product showed it to consist of approximately 51% methoxyethyl methacrylate and 49% methyl methacrylate.

By "alpha-substituted acrylic acid ester" as used herein, is meant esters of acrylic acid substituted at the alpha carbon atom by a monovalent hydrocarbon radical such as alkyl, aryl, aralkyl, or alicyclic radicals, such, for example, as alpha-phenyl acrylic, alpha-butyl acrylic, alpha-amyl acrylic, alpha-isopropyl acrylic, alpha-ethyl acrylic, alpha-hexyl acrylic, alpha-(methylphenyl) acrylic, alpha-(methylcyclohexyl) acrylic, alpha-cyclohexyl acrylic, etc., acids.

There may be used in the present interchange process any alcohol other than that to be displaced from the acrylic or alpha-substituted acrylic acid ester polymer. The alcohol may be branched or straight chain, aliphatic or aromatic, heterocyclic or alicyclic, saturated or unsaturated, or may contain other groups such as amino, ketone, ether, ester, etc. Examples of suitable alcohols are ethyl, butyl, isobutyl, amyl, hexyl, decyl, lauryl, stearyl, oleyl, linalyl, benzyl, tetrahydrofurfuryl, furfuryl, 4-methylcyclohexyl, beta-phenylethyl, naphthenyl, ethoxyethyl, ethoxyethoxyethyl, etc. Secondary and tertiary alcohols are less suitable because of their tendency to dehydrate. Polyhydric alcohols such as glycol, diethylene glycol, and glycerol may be used though with difficulty. A particularly valuable class of interpolymers may be obtained from amino alcohols, for example beta-dimethylaminoethanol, beta-diethylaminoethanol, phenylaminocyclohexanol, beta-cyclohexylaminoethanol, 2-aminocyclohexanol, 2-(diethylamino)-cyclohexanol, beta-morpholine-N-ethanol, and others mentioned in applications Numbers 21,807 and 21,810 filed May 16, 1935. Interpolymers from amino alcohols possess to a greater or lesser extent the specific property of acid-solubility which renders them of particular utility in the arts, as discussed below.

In place of the sodium methoxide of the examples, other alcoholysis catalysts may be used, such as sodium ethoxide, sodium glyceroxide and alkali metal alcoholates generally; sodium hydroxide, calcium oxide, litharge; etc. Alkaline alcoholysis catalysts are in general more satisfactory, though in some instances acid alcoholysis catalysts, e. g. sulfuric and hydrochloric acids, may be employed.

While it is generally preferred to carry out the ester interchange reaction at ordinary pressures, in some cases the use of super-atmospheric pressures is advantageous.

Interpolymers prepared in accord with the present invention have been found suitable for many uses, such as adhesives; emulsifying agents; dispersing agents for pigments, waxes, and oils, and as agents for fixing these materials to fabrics, paper, and leather; fixatives for acid dyes; plastics; size coats for improving the anchorage of lacquer to thin transparent sheets of regenerated cellulose; as ingredients of coating compositions generally, both of the aqueous and organic-solvent type, with or without materials commonly employed in such compositions, such as waxes, oils, cellulose derivatives, other resins, etc.; and stabilizers for acid-yielding resins, solvents, plasticizers and rubbers, such as chlorinated rubber, rubber hydrochloride, vinyl chloroacetate, etc.

From a consideration of the above specification it will be realized that many changes may be made in the process and product disclosed therein without departing from the scope of the invention or sacrificing any of the advantages that may be derived therefrom.

I claim:

1. A process which comprises the partial alcoholysis of a polymeric ester of an acid selected from the group consisting of acrylic acid and alpha hydrocarbon substituted acrylic acids with an alcohol boiling higher than the alcohol whose radical forms a part of the polymeric ester.

2. A process which comprises the partial alcoholysis of a polymeric ester of an acid selected from the group consisting of acrylic acid and alpha hydrocarbon substituted acrylic acids with a primary monohydric alcohol boiling higher than the alcohol whose radical forms a part of the polymeric ester.

3. A process which comprises the partial alcoholysis of a polymeric ester of an alpha-hydrocarbon substituted acrylic acid with an alcohol boiling higher than the alcohol whose radical forms a part of the polymeric ester.

4. A process which comprises the partial alcoholysis of a polymeric ester of an alpha-hydrocarbon substituted acrylic acid with a primary monohydric alcohol boiling higher than the alcohol whose radical forms a part of the polymeric ester.

5. A process which comprises the partial alcoholysis of a polymeric ester of alpha-methyl acrylic acid with a primary monohydric alcohol boiling higher than the alcohol whose radical forms a part of the polymeric ester.

6. A process which comprises the partial alcoholysis of polymeric methyl alpha-methacrylate with alcohol boiling higher than methanol.

7. A process which comprises the partial alcoholysis of, in the presence of an alcoholysis catalyst, a polymeric ester of an acid selected from the group consisting of acrylic acid and alpha hydrocarbon substituted acrylic acids with a primary monohydric alcohol boiling higher than the alcohol whose radical forms a part of the polymeric ester.

8. A process which comprises the partial alcoholysis of, in the presence of an alkali metal alcoholate, a polymeric ester of an acid selected from the group consisting of acrylic acid and alpha hydrocarbon substituted acrylic acids with a primary monohydric alcohol boiling higher than the alcohol whose radical forms a part of the polymeric ester.

9. A process which comprises the partial alcoholysis of a polymeric ester of an acid selected from the group consisting of acrylic acid and alpha hydrocarbon substituted acrylic acids with a primary monohydric alcohol boiling higher than the alcohol whose radical forms a part of the polymeric ester, and removing the liberated alcohol.

10. In the process of the partial alcoholysis, in the presence of an alkaline alcoholysis catalyst and an inert solvent, of a polymeric ester of an acid selected from the group consisting of acrylic acid and alpha hydrocarbon substituted acrylic acids with an alcohol boiling higher than the alcohol whose radical forms a part of the polymeric ester, the steps which include refluxing the mixture of catalyst, inert solvent, polymeric ester and alcohol, distilling off a binary of solvent and liberated alcohol, and isolating the reaction product.

11. An interpolymer prepared by reacting a polymeric ester of an acid selected from the group consisting of acrylic acid and alpha hydrocarbon substituted acrylic acids with an alcohol boiling higher than the alcohol whose radical forms a part of the polymeric ester.

12. A process which comprises refluxing a mixture containing a polymeric lower alkyl ester of acid selected from the group consisting of acrylic acid and alpha hydrocarbon substituted acrylic acids with an alcohol boiling higher than the alcohol whose alkyl radical forms a part of the polymeric ester, in the presence of an inert solvent and an alkaline alcoholysis catalyst until substantially no more replaced alcohol is liberated from the reaction.

13. A process which comprises refluxing a mixture containing a polymeric lower alkyl ester of an alkacrylic acid with an alcohol boiling higher than the alcohol whose alkyl radical forms a part of the polymeric ester, in the presence of an inert solvent and an alkaline alcoholysis catalyst until substantially no more replaced alcohol is liberated from the reaction.

14. A process which comprises refluxing a mixture containing polymeric methyl methacrylate and isobutyl alcohol in the presence of an inert solvent and an alkaline alcoholysis catalyst until substantially no more methanol is liberated from the reaction.

15. A process which comprises refluxing a mixture containing polymeric methyl acrylate and isobutyl alcohol in the presence of an inert solvent and an alkaline alcoholysis catalyst until substantially no more methanol is liberated from the reaction.

16. A process which comprises refluxing a mixture containing one mol. of polymeric methyl methacrylate, one mol. of isobutyl alcohol, approximately four mols of toluene and approximately 0.2 mol. of sodium dissolved in approximately 6.5 mols of methanol until substantially no more methanol is liberated from the reaction and finally separating the product from the toluene.

HAROLD JAMES BARRETT.